United States Patent
Pawl et al.

(10) Patent No.: US 9,500,106 B2
(45) Date of Patent: Nov. 22, 2016

(54) TWO-PIECE VALVE STEM SEAL

(75) Inventors: Rory S. Pawl, Waterford, MI (US); Patrick L. Scheib, Cornelia, GA (US); John A. London, Cornelia, GA (US)

(73) Assignee: Freudenberg—NOK General Partnership, Plymouth, MI (US)

( * ) Notice: Subject to any disclaimer, the term of this patent is extended or adjusted under 35 U.S.C. 154(b) by 1376 days.

(21) Appl. No.: 12/469,195

(22) Filed: May 20, 2009

(65) Prior Publication Data
US 2010/0295252 A1  Nov. 25, 2010

(51) Int. Cl.
*F01L 3/08* (2006.01)
*F01L 3/10* (2006.01)
*F16J 15/32* (2016.01)

(52) U.S. Cl.
CPC .............. *F01L 3/08* (2013.01); *F16J 15/3224* (2013.01); *F16J 15/3252* (2013.01); *F16J 15/3268* (2013.01); *F01L 3/10* (2013.01)

(58) Field of Classification Search
USPC .......... 277/502, 607, 616; 285/39, 322, 323, 285/340; 251/214; 123/190.17, 188.6
See application file for complete search history.

(56) References Cited

U.S. PATENT DOCUMENTS

| | | | |
|---|---|---|---|
| 1,481,562 A * | 1/1924 | Rowe | 123/188.6 |
| 3,480,286 A | 11/1969 | Kosatka | |
| 3,554,180 A | 1/1971 | Lesser | |
| 3,554,562 A * | 1/1971 | Davis, Jr. | 277/502 |
| 3,625,525 A * | 12/1971 | Davis, Jr. | 277/502 |
| 3,699,942 A * | 10/1972 | Moray | 123/188.6 |
| 3,782,684 A | 1/1974 | Stephens et al. | |
| 4,248,459 A * | 2/1981 | Pate et al. | 285/319 |
| 4,490,576 A * | 12/1984 | Bolante et al. | 174/655 |
| 4,811,704 A * | 3/1989 | Boehmer et al. | 123/188.6 |
| 4,811,960 A | 3/1989 | Stritzke et al. | |
| 4,826,180 A | 5/1989 | Deuring | |
| 4,909,202 A | 3/1990 | Binford et al. | |
| 4,928,644 A | 5/1990 | Travis | |
| 4,947,811 A | 8/1990 | Binford | |
| 5,002,018 A | 3/1991 | Strout | |
| 5,062,397 A | 11/1991 | Larson | |
| 5,067,449 A | 11/1991 | Bonde | |
| 5,110,142 A | 5/1992 | Szott | |
| 5,129,624 A | 7/1992 | Icenhower et al. | |
| 5,174,256 A * | 12/1992 | Binford | 123/188.6 |

(Continued)

*Primary Examiner* — Kristina Fulton
*Assistant Examiner* — Nicholas L Foster
(74) *Attorney, Agent, or Firm* — Daniel J. Sepanik, Esq.; Harness, Dickey & Pierce, P.L.C.

(57) ABSTRACT

A valve stem seal utilizes a multi-piece construction to reduce the required manufactured tolerances and/or improve the stress handling capabilities. The valve stem seal can include a first member or can which can be assembled to a second member or spring seat. The can and/or spring seat can have a plurality of axially extending resilient fingers that are biased such that when assembled the fingers are bent against the bias due to the engagement between the can and the spring seat. The fingers on the spring seat allow the spring seat to bend or move relative to the can to accommodate the loading of a valve spring on the spring seat. The use of resilient fingers on the can and/or the spring seat reduces the manufacturing tolerances required for the valve stem seal.

6 Claims, 8 Drawing Sheets

(56) References Cited

U.S. PATENT DOCUMENTS

| | | | |
|---|---|---|---|
| 5,237,971 A | | 8/1993 | Worsley |
| 5,472,216 A | | 12/1995 | Albertson et al. |
| 5,558,056 A | * | 9/1996 | Sakata ................. 123/188.6 |
| 5,775,284 A | * | 7/1998 | Kirchner et al. ......... 123/188.6 |
| 5,880,905 A | * | 3/1999 | Kazmierczak et al. ... 360/98.08 |
| 6,230,679 B1 | * | 5/2001 | Hegernier et al. ....... 123/190.17 |
| 6,378,912 B1 | * | 4/2002 | Condon et al. ............. 285/220 |
| 6,685,230 B1 | * | 2/2004 | Bottura ...................... 285/39 |
| 6,901,902 B1 | * | 6/2005 | Butcher et al. ............ 123/188.6 |
| 7,025,030 B2 | * | 4/2006 | Leimer ..................... 123/188.6 |
| 2004/0070198 A1 | * | 4/2004 | Rohrig ....................... 285/39 |
| 2005/0121902 A1 | * | 6/2005 | Hull et al. .................. 285/43 |
| 2007/0075542 A1 | * | 4/2007 | Glaze et al. ............... 285/322 |
| 2011/0024666 A1 | * | 2/2011 | London et al. ............. 251/366 |

\* cited by examiner

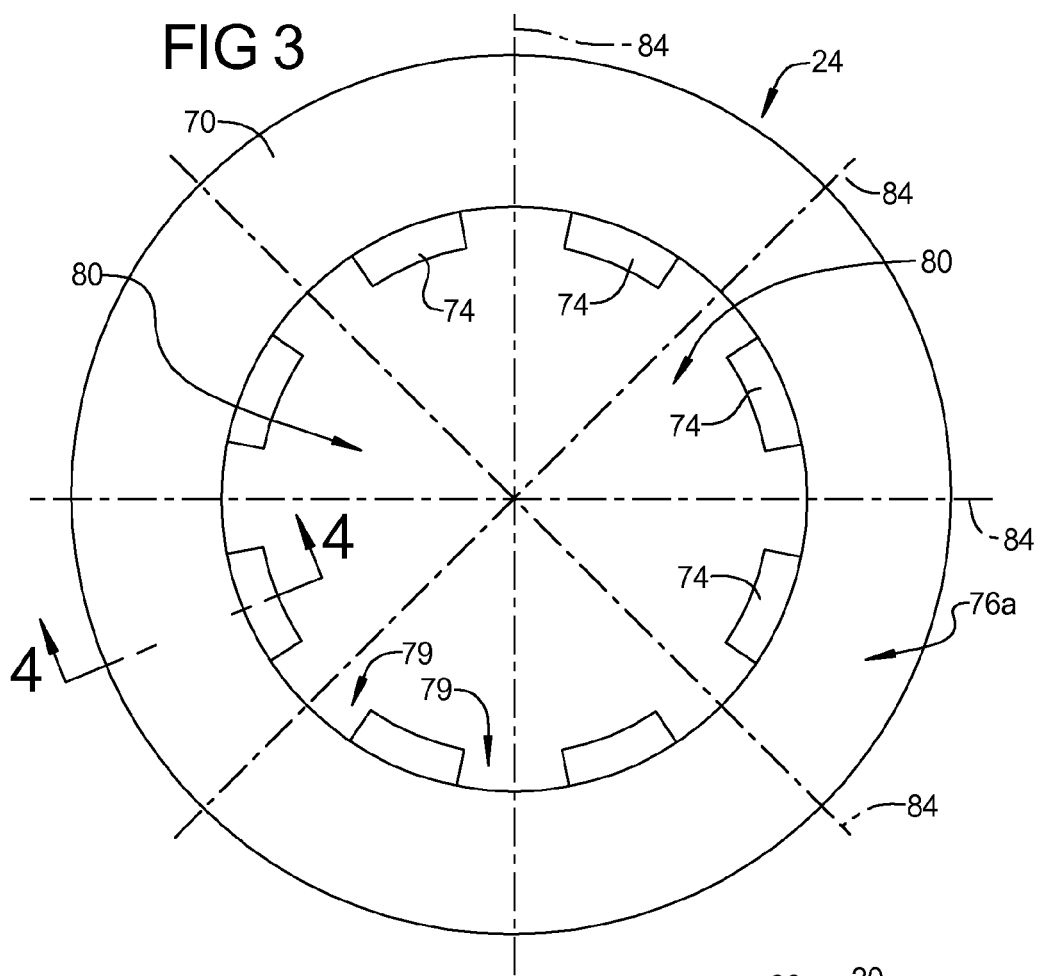
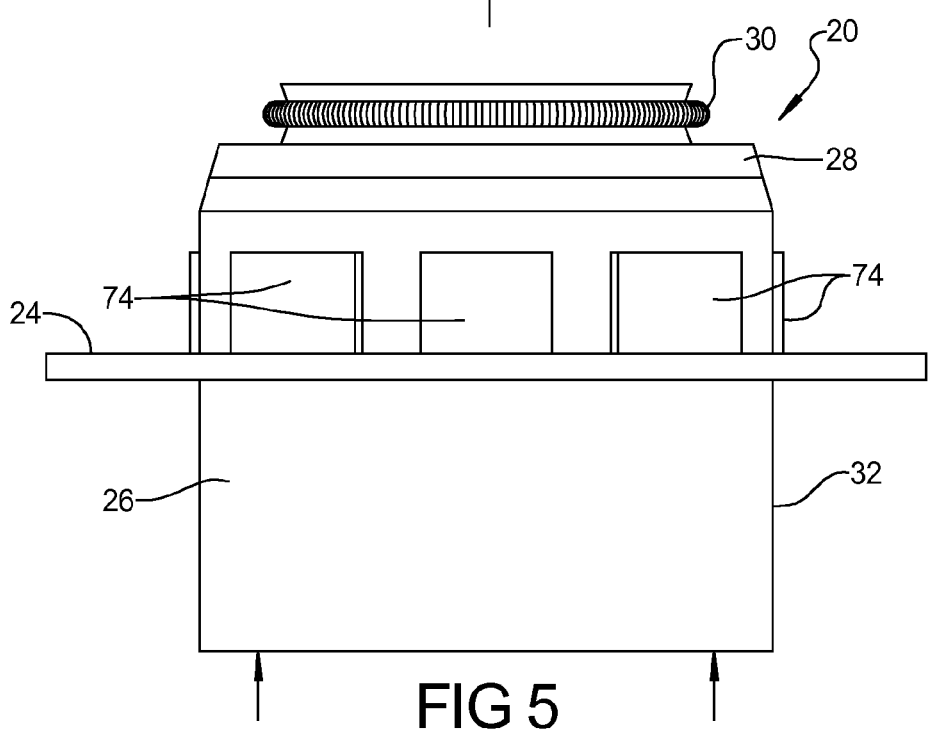

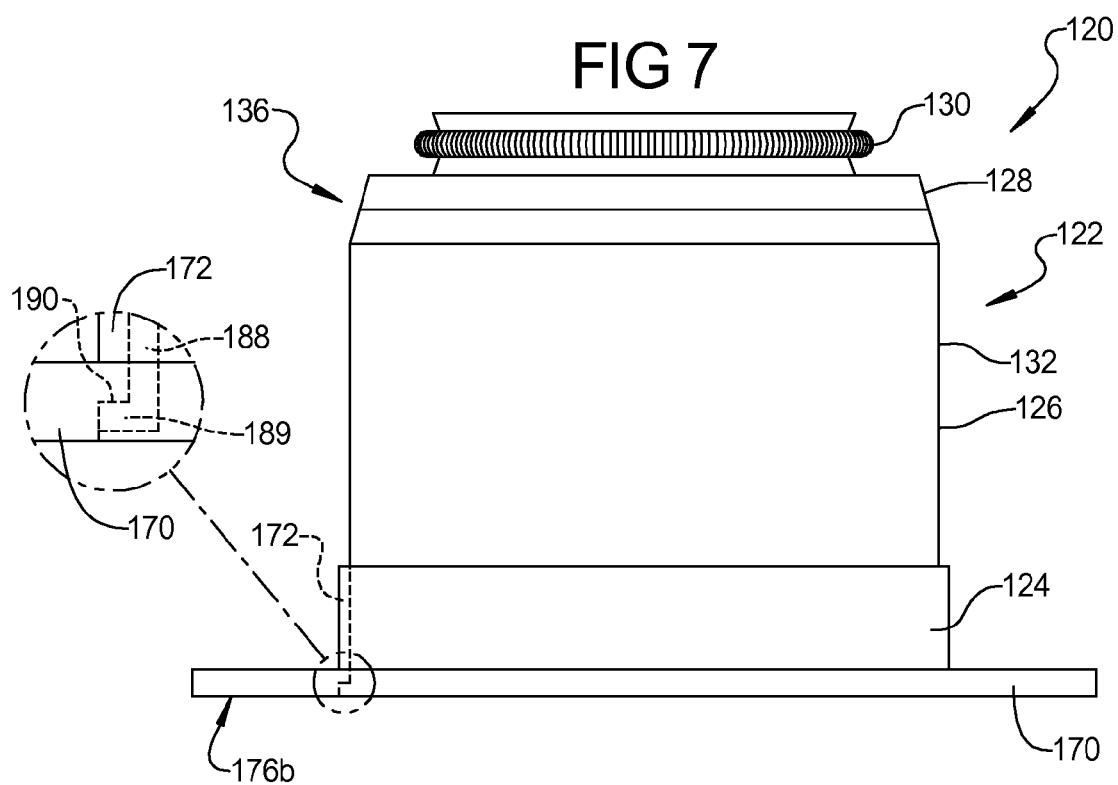
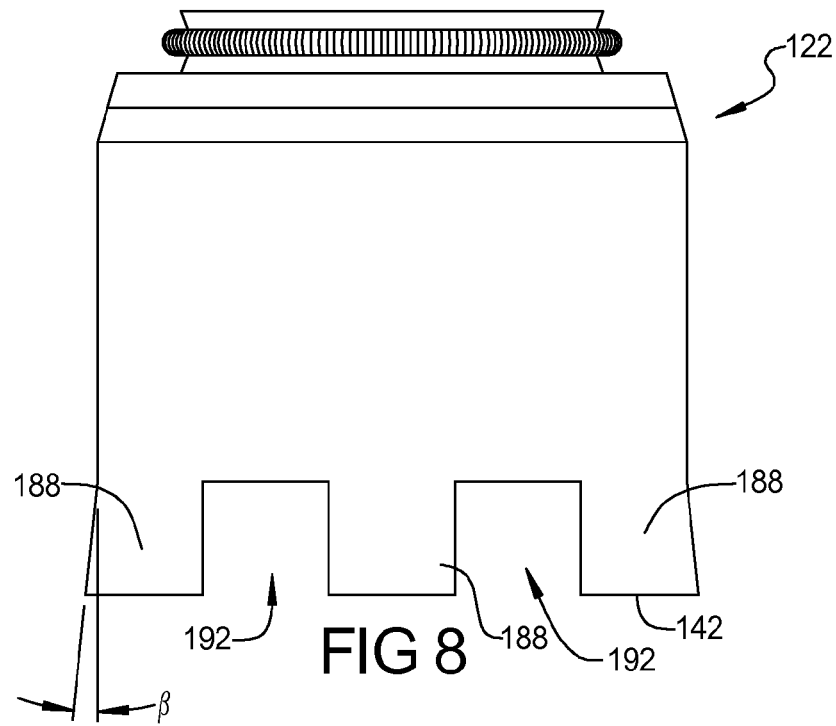

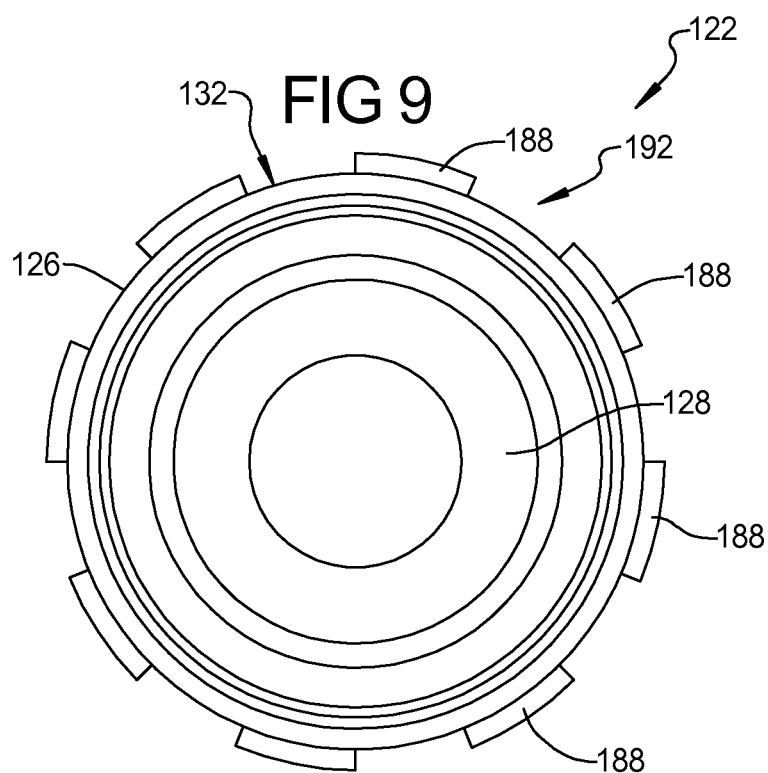
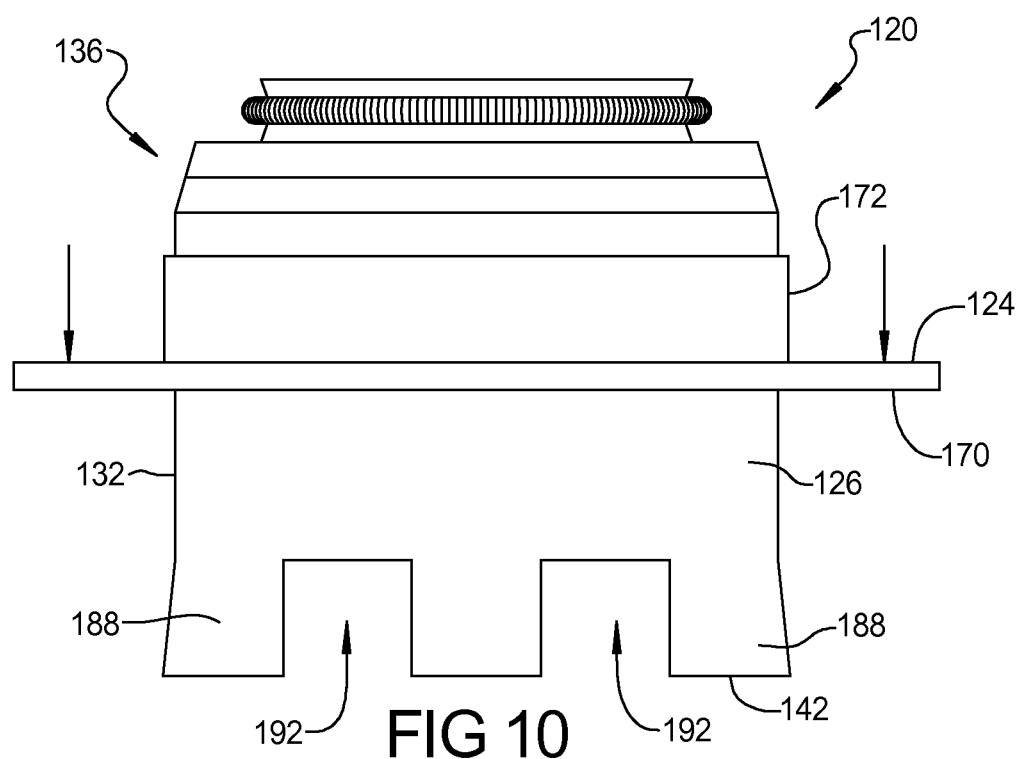

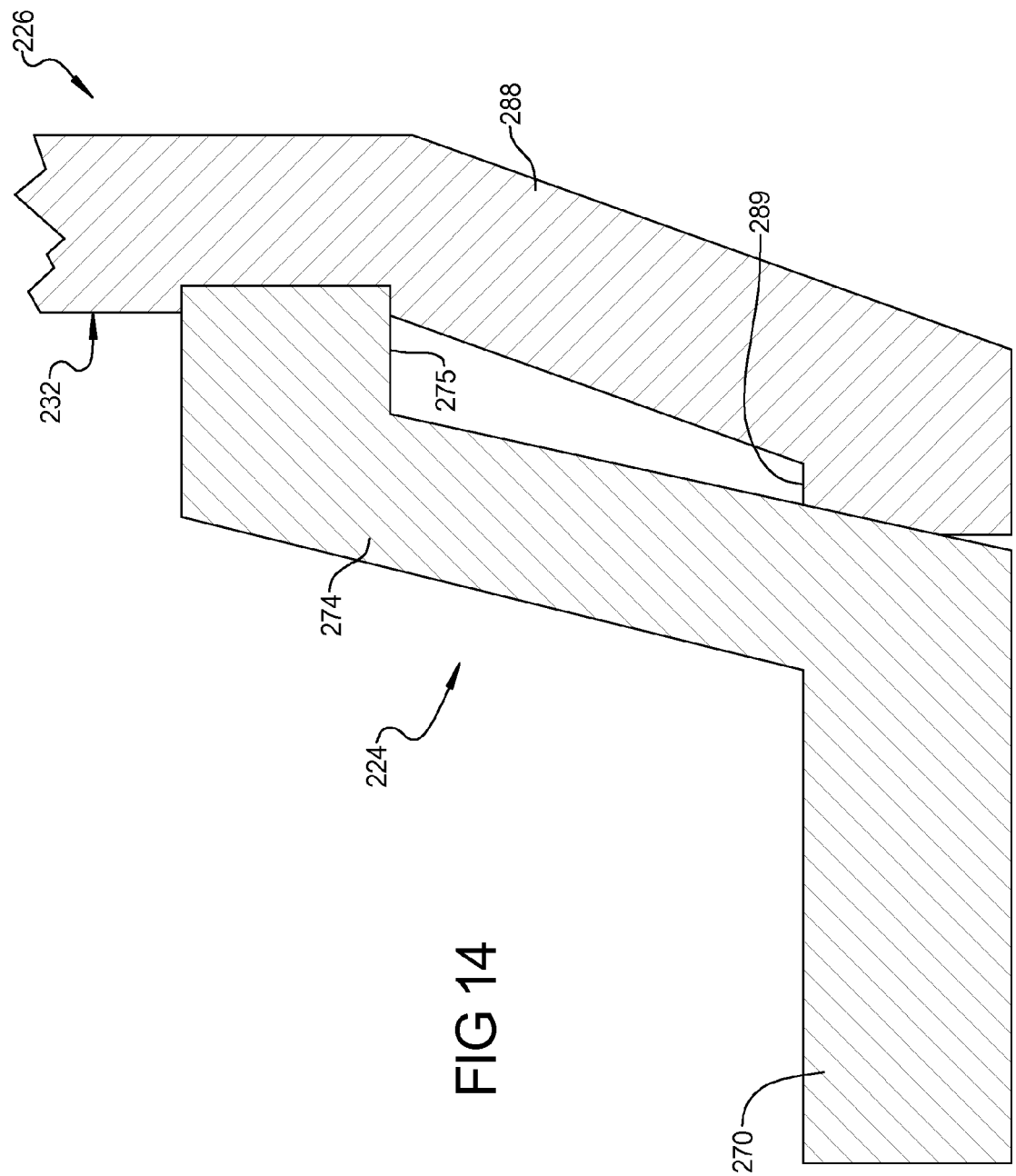

TWO-PIECE VALVE STEM SEAL

FIELD

The present disclosure relates to valve stem seals and, more particularly, to a two-piece valve stem seal, such as those used in an internal combustion engine but applicable to other valve stem sealing applications.

BACKGROUND AND SUMMARY

This section provides background information related to the present disclosure which is not necessarily prior art. This section also provides a general summary of the disclosure, and is not a comprehensive disclosure of its full scope or all of its features.

The primary function of a valve stem seal in an internal combustion engine, for example, is to allow adequate lubrication at the valve stem/valve guide interface while minimizing internal oil consumption. A valve stem seal assembly generally includes a rigid shell structure and a seal body, with the assembly having a generally hollow interior adapted to receive a valve stem guide. Typically, the shell structure supports the seal body, which surrounds the valve stem in order to essentially "meter" the provision of oil for lubricating the valve guide's inner diameter and the outer diameter of the valve stem. At the same time, however, the valve stem seal serves to minimize the amount of oil that can be drawn into the combustion chamber or pass to the engine's exhaust.

The rigid shell structure typically includes a can or cylindrical member and a spring seat that is press fit thereon and extends radially outwardly to provide a surface for the valve spring. The interface between the can and the spring seat is generally rigid and not flexible. This rigid interface results in stress concentrations that can cause cracking or breaking of the spring seat during vehicle operations due to resonance conditions caused by valvetrain harmonics. In particular, a valve spring sits on the spring seat and applies a force thereon at two locations that are about 180 degrees apart. During certain operating conditions, the valve spring may rotate relative to the spring seat such that the two points of impact between the valve spring and the spring seat rotate along the surface of the spring seat. During resonance conditions, the force of the spring on the spring seat can exceed the design specifications such that fatigue and cracking of the spring seat can occur, resulting in failure of the valve stem seal. While it may be possible to design the valve stem seal to a degree that can accommodate the forces associated with a resonance condition, such valve stem seal would have a significantly greater cost. Thus, it would be advantageous to provide an economical valve stem seal that can accommodate the high resonance loads while reducing the possibility of failure of the valve stem seal.

Additionally, the two-piece valve stem seals typically require manufacture to high tolerances to provide the desired interactions and level of rigidity. The high tolerance requirement increases the costs of the valve stem seal. Thus, it would be advantageous to provide a two-piece valve stem seal with a lower dimensional tolerance such that a more economical valve stem seal may be realized. Additionally, the reduced tolerance requirement may facilitate easier assembly of the two-piece valve stem seal.

A valve stem seal according to the present teachings utilizes a multi-piece construction to reduce the required manufacturing tolerances and/or improve the stress handling capabilities. The valve stem seal can include a first member or can which is assembled to a second member or spring seat. The can and/or spring seat can have a plurality of axially extending resilient fingers that are biased such that when assembled the fingers are bent against the bias due to the engagement between the can and/or the spring seat. The fingers on the spring seat allow the spring seat to bend or move relative to the can to accommodate the loading of a valve spring on the spring seat. The relative movement reduces and/or minimizes the possibility of stress concentrations occurring on the spring seat such that the lifespan of the valve stem seal may be increased. The use of resilient fingers on the can and/or the spring seat reduces the manufacturing tolerances required for the valve stem seal such that a more economical valve stem seal may be realized.

A valve stem seal according to the present teachings can be used in a valve-containing device having a valve with a valve stem thereon. The valve stem seal can include a first member having axially opposite first and second ends with a side wall extending axially therebetween. The first member can have a hollow interior defined at least partially by the side wall. A second member has a radially extending flange portion with an opening therethrough and an axially extending portion circumscribing at least a portion of the opening. A resilient seal body is supported by the first member adjacent the first end. The seal body has a seal body opening therethrough for receiving the valve stem in sealing contact therewith when the valve stem seal is assembled into the valve-containing device. The first member and the second member are assembled together with the second member opening extending around the second end of the first member and the axially extending portion engaged with the side wall. At least one of the side wall adjacent the second end of the first member and the axially extending portion of the second member include a plurality of axially extending resilient fingers with gaps therebetween and that bend radially relative to the respective side wall of the first member and the flange portion of the second member.

A valve stem seal according to the principles of the present invention can be used in a valve-contained device having a valve with a valve stem thereon. The valve stem seal can include a can having axially opposite first and second ends with a side wall extending axially therebetween. The can may have a hollow interior defined at least partially by the side wall. A spring seat has a radially extending flange portion with axially opposite first and second surfaces and a central opening extending therethrough. The spring seat has a plurality of resilient spring seat fingers spaced apart around the opening and extending axially away from the first surface. The spring seat fingers are biased radially inwardly. A resilient seal body is supported by the can adjacent the first end. The seal body has a seal body opening extending therethrough for receiving the valve stem in sealing contact therewith when the valve stem seal is assembled into the valve-containing device. The spring seat and the can are assembled together with the spring seat surrounding the second end of the can. The can extends at least partially through the opening. The spring seat fingers are bent radially outwardly due to engagement with the side wall such that the spring seat fingers apply a radially inward force on the side wall. The spring seat fingers allow the spring seat to move relative to the can when the first surface is cyclically loaded by a valve spring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a top plan view of the spring seat of FIG. 2;

FIG. 5 is a plan view of the assembly of the can into the spring seat according to the present teachings;

FIG. 7 is a plan view of a second embodiment of a valve stem seal according to the present teachings;

FIG. 8 is a plan view of the can assembly of the valve stem seal of FIG. 7;

FIG. 9 is a top plan view of the can assembly of FIG. 8;

FIG. 10 is a plan view of the assembly of the spring seat onto the can assembly to form the valve stem seal of FIG. 7;

FIG. 14 is a fragmented cross-sectional view along line 14-14 of FIG. 11 showing the interlocking of the spring seat with the can.

DETAILED DESCRIPTION

Figure 1:
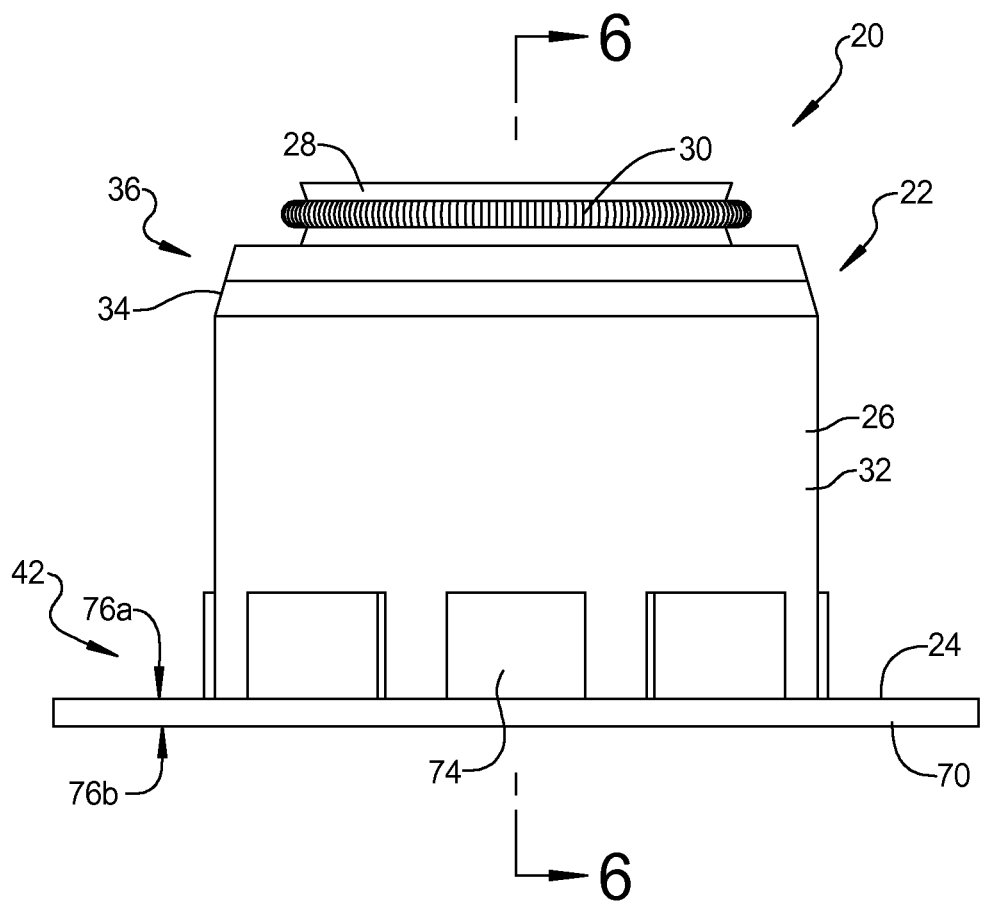
FIG. 1 is a plan view of a first embodiment of a valve stem seal according to the present teachings.

Example embodiments will now be described more fully with reference to the accompanying drawings.

The following description is merely exemplary in nature and is not intended to limit the present teachings, applications or uses. It should be understood that throughout the drawings, corresponding reference numerals indicate like or corresponding parts and features (e.g., 20,120, 220, etc.).

Referring to FIGS. 1-6, a preferred embodiment of a valve stem seal 20 according to the present teachings is shown. Valve stem seal 20 is a multi-piece construction and includes a can assembly 22 and a spring seat 24. Can assembly 22 includes a generally cylindrical can 26, a seal body 28, and a spring 30, such as a garter spring by way of non-limiting example. Can 26 is generally cylindrical with side wall 32 extending generally parallel with the longitudinal or axial axis of can 26. Can 26 may include a tapering portion 34 adjacent a first end 36. Tapering portion 34 tapers radially inwardly toward the longitudinal axis of can 26. First end 36 can include a radially extending flange 38 that defines a circular opening 40 through first end 36. A second end 42 of can 26 is formed by side wall 32 and defines a second circular opening 44. Openings 40, 44 are axially aligned with one another. Side wall 32 adjacent second end 42 can be a continuous annular wall and engages with spring seat 24, as described below.

Seal body 28 is resilient and can be directly molded onto flange 38 of can 26. However, other variations may be used for connecting seal body 28 to can 26, such as by an interference fit, adhesives, epoxies, or other known connections capable of creating a relatively fixed joint between can 26 and seal body 28, by way of non-limiting example. Seal body 28 is resilient and can be rubber, a rubber-containing material, or other resilient elastomeric or plastic materials capable of sealing in the given environment, by way of non-limiting example. Lower portion 46 of seal body 28 can be dimensioned to be compressed between a valve guide 48 of a cylinder head 50 and the interior portion of side wall 32 and flange 38. The compressing of seal body 28 therebetween can form a seal that inhibits oil flow between seal body 28 and exterior surface of valve guide 48. An upper portion 52 of seal body 28 defines a smaller circular opening 54 that is dimensioned to engage with an exterior surface of a valve stem 56. Spring 30 can be disposed in an exterior recess 58 of upper portion 52 to squeeze an annular sealing lip 60 of upper portion 52 against the exterior surface of valve stem 56. In this manner, upper portion 52 can limit the flow of oil along the exterior surface of valve stem 56 and that which flows into the gap between the exterior surface of valve stem 56 and the interior surface of the opening in valve guide 48.

Figure 2:
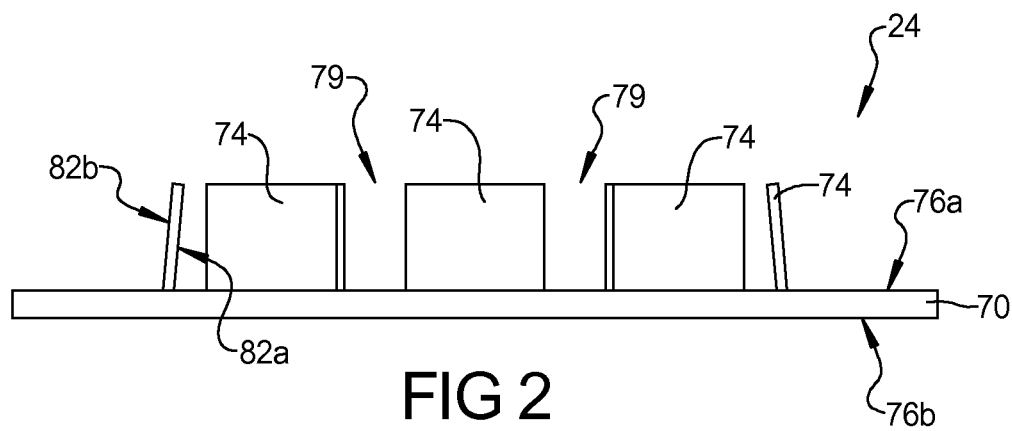
FIG. 2 is a plan view of the spring seat of the valve stem seal of FIG. 1.
Figure 4:
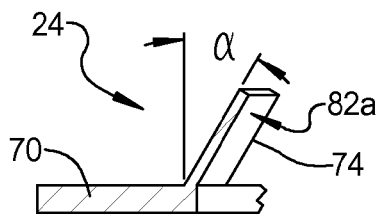
FIG. 4 is a fragmented cross-sectional view along line 4-4 of FIG. 3.
Figure 6:
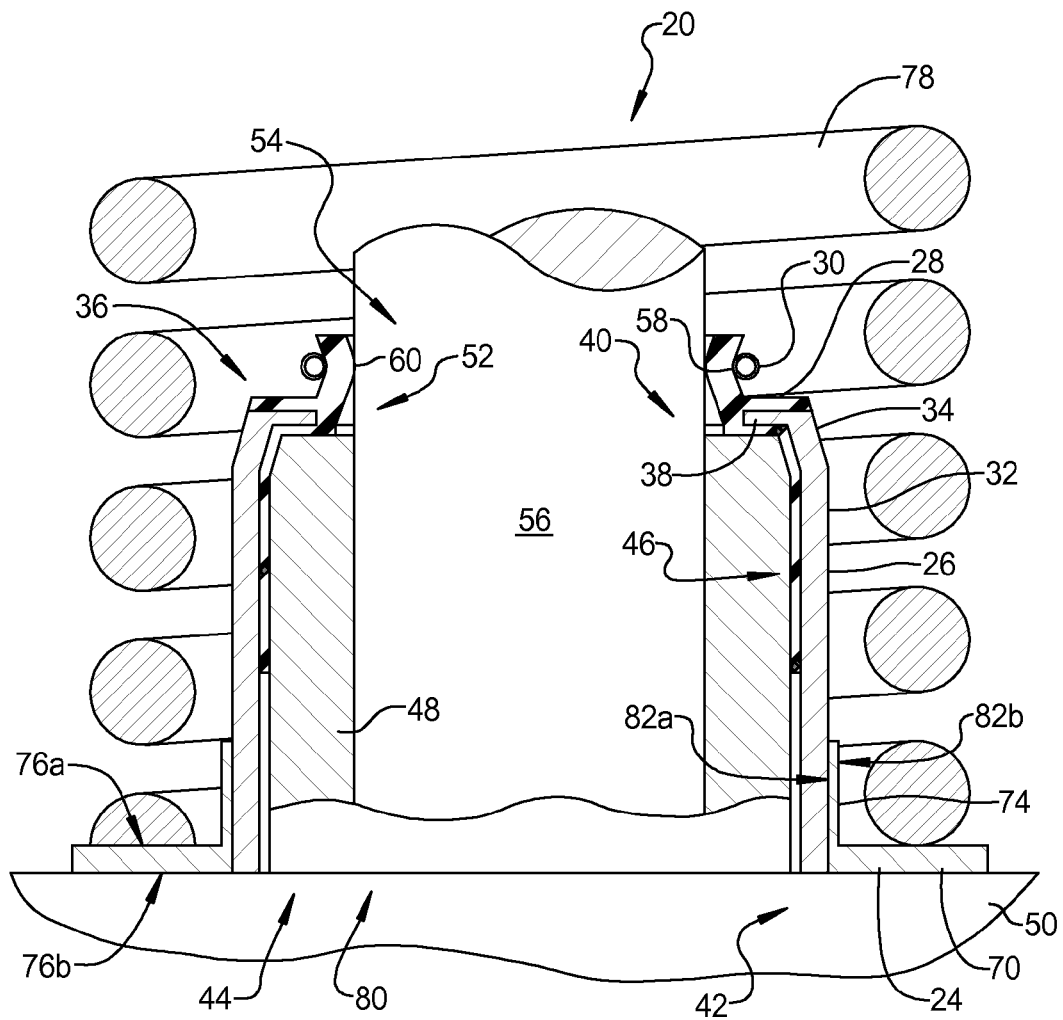
FIG. 6 is a cross-sectional view along line 6-6 of FIG. 1 showing the valve stem seal on a portion of a cylinder head.

Spring seat 24 includes a radially extending flange portion 70 and a plurality of resilient spring fingers 74 that extend axially upwardly therefrom. Flange portion 70 includes axially opposite upper and lower surfaces 76a, 76b. Upper and lower surfaces 76a, 76b are generally parallel to one another. Lower surface 76b engages with the surface of cylinder head 50 while upper surface 76a engages with the lower portion of valve spring 78. Fingers 74 extend axially upwardly from upper surface 76a of flange portion 70 and are spaced about a central opening 80 with gaps 79 therebetween. Fingers 74 include opposite inner and outer surfaces 82a, 82b. Inner and outer surfaces 82a, 82b can be generally parallel to one another. Inner surface 82a engages with side wall 32 when assembled on can 26. When spring seat 24 is not assembled on can 24, as shown in FIGS. 2-4, fingers 74 extend radially inwardly as they extend axially upwardly from upper surface 76a of flange portion 70. In particular, fingers 74 can extend at an angle a from an axis perpendicular to upper surface 76a as fingers 74 extend away from flange portion 70. By way of non-limiting example, angle a may be from greater than about 0° to about 10°.

Fingers 74 can resiliently flex relative to flange portion 70 to allow assembly of can 26 into opening 80 of spring seat 24. As shown in FIG. 5, can assembly 22 can be inserted into opening 80 of spring seat 24 from below and pushed upwardly relative thereto. As can assembly 22 extends through opening 80, inner surface 82a of fingers 74 engage with side wall 32 and flex radially outwardly to accommodate can 26. As a result, fingers 74 are biased radially inwardly against the displacement of fingers 74 radially outwardly by can 26. Can assembly 22 is continued to be inserted into opening 80 and spring seat 24 until second end 42 is generally flush with lower surface 76b of flange portion 70. In some embodiments, a positive stop can be utilized to limit the relative axial position of can 26 relative to flange portion 70. By way of non-limiting example, the positive stop can include a radially outwardly flared portion on the lower end of can 26 and a complementary recess in outer surface 76b of flange portion 70 adjacent the central opening, similar to that shown in FIG. 7 and described below with reference to valve stem seal 120. The bias of fingers 74 radially inwardly applies a gripping force on can 26. Fingers 74 thereby grippingly engage can 26.

Can 26 and spring seat 24 can be made from a variety of materials. For example, can 26 and spring seat 24 can be metal or a metal-containing material, such as 1008 or 1010 cold rolled steel and the like, by way of non-limiting example. Spring seat 24 is rigid and may be hardened. Can 26 is also rigid and may be hardened or non-hardened. Additionally, spring seat 24 does allow some bending, as described below. However, it should be appreciated that fingers 74 can flex relative to flange portion 70 to accommodate can 26 while also allowing some relative movement between can 26 and spring seat 24, as described below.

Fingers 74 can be spaced symmetrically about opening 80 in flange portion 70. The symmetric spacing of fingers 74 results in a plurality of axes of symmetry 84, as shown in FIG. 3. In the configuration shown, there are eight fingers 74 resulting in four axes of symmetry 84. It should be appreciated, that the number of fingers 74 can vary from that shown and, accordingly, so can the number of axes of symmetry 84.

One end of valve spring 78 engages with upper surface 76a of flange portion 70 when installed on cylinder head 50. The engagement of valve spring 78 with upper surface 76a typically results in two distinct points of contact which are typically 180 degrees apart. During movement of valve stem 56, valve spring 78 will apply a load to flange portion 70 at the points of contact. The ability of fingers 74 to flex relative to flange portion 70 allows spring seat 24 to move relative to can 26 as a result of the force applied by valve spring 78. The ability of fingers 74 to flex relative to flange portion 70 allows flange portion 70 to bend along the axes of symmetry 84 (or areas proximate thereto) due to the force applied by valve spring 78. The relative movement reduces the stress concentrations at the interface of spring seat 24 with can 26. As a result, the propensity of breaking or having stress concentrations sufficient to cause damage to and/or reduction in the life cycle of valve stem seal 20 is reduced. The resilient nature of fingers 74 continually bias can 26 relative to spring seat 24 such that alignment between spring seat 24 and can 26 can be maintained or returned. During the operation, valve spring 78 may rotate relative to can 26 and/or spring seat 24. As a result, the loading of valve spring 78 on flange portion 70 can also rotate along upper surface 76a. The multiple axes of symmetry 84 allows bending of flange portion 70 to occur as the loading from valve spring 78 moves along upper surface 76a thereby reducing stress concentrations and the propensity for damage to occur. It should be appreciated that in some embodiments spring seat 24 may rotate relative to can 26.

The outer diameter of can 26 adjacent second end 42 is very close in dimensions to the inner diameter of opening 80 in spring seat 24. As a result, a very small clearance may exist that allows spring seat 24 to be fully disposed on can 26. The bending of fingers 74 outwardly by can 26 results in fingers 74 providing a radially inwardly directed gripping force as fingers 74 try to return to their original relaxed state. Thus, a spring or grip fit is provided between can 26 and spring seat 24. Furthermore, the flexible nature of fingers 74 allow for the relative bending or twisting of spring seat 24 relative to can 26 during operation. As a result, the potential for stress concentrations is reduced and the lifespan of the valve stem seal 20 can be increased. Additionally, the ability to accommodate relative movement between spring seat 24 and can 26 reduces the manufacturing tolerances required when producing spring seat 24 and can 26. As a result, a more economical valve stem seal 20 may be realized.

It should be appreciated that fingers 74 can take a variety of forms. For example, fingers 74 can be generally rectangular in plan view as they curve along opening 80. In other embodiments, fingers 74 can be triangular, trapezoidal, and rounded by way of non-limiting example. Additionally, the radial dimension or thickness of fingers 74 can vary to provide the desired radially inward biasing force against can 26 and to provide the desired relative flexibility between can 26 and spring seat 24. Thus, the specific configuration of fingers 74 shown are merely exemplary in nature and are not intended to limit the scope of the present teachings.

Referring now to FIGS. 7-10, a second embodiment of a valve stem seal 120 according to the present teachings is shown. Valve stem seal 120 is similar to valve stem seal 20 discussed above. As such, only the main differences will be described herein. Valve stem seal 120 includes a can assembly 122 that includes a can 126, a seal body 128, and a spring 130 that is assembled onto a spring seat 124. In valve stem seal 120, spring seat 124 does not include fingers. Rather, spring seat 124 includes an axially extending annular ring portion 172 that extends from flange portion 170 and surrounds opening 180. Annular portion 172 and flange portion 170 are an integral one-piece construction and are substantially rigid such that only minimal or negligible flexing between annular portion 172 and flange portion 170 occurs. Spring seat 124 may be hardened while can 126 may be non-hardened to allow some flexibility, as described below.

In valve stem seal 120, second end 142 of can 126 includes a plurality of resilient spring fingers 188 that flare radially outwardly as they extend axially toward second end 142. For example, fingers 188 can flare radially outwardly at an angle $\beta$ relative to the surface of side wall 132 above fingers 188. The angle $\beta$ can vary depending upon the particular application. In some embodiments, angle $\beta$ may be from greater than about 0° to about 10°, by way of non-limiting example. The fingers 188 can be spaced apart along side wall 132 with gaps 192 therebetween. Fingers 188 can be spaced equally apart, as shown in FIG. 9, such that they are symmetrical around the periphery of can 126. It should be appreciated that the number and orientation of fingers 188 can vary from that shown.

Fingers 188 are flexible and can be bent or compressed radially inwardly toward the central longitudinal or axial axis of can 126 when spring seat 124 is assembled thereon. In particular, the central opening in spring seat 124 can be aligned with first end 136 of can 126 and then pressed onto can 126, as shown in FIG. 10. As spring seat 124 continues to move toward second end 142, spring seat 124 engages with fingers 188 and bends fingers 188 radially inwardly. Spring seat 124 continues to be pressed onto can 126 until a positive stop between spring seat 124 and can 126 is engaged. By way of non-limiting example, the positive stop can include a radially outwardly flared portion 189 on finger 188 and a complementary recess 190 in outer surface 176b of flange portion 170 adjacent the central opening, as shown in FIG. 7. The engagement between flared portion 189 and recess 190 limits the relative axial positioning of spring seat 124 on can 126.

The flexible nature of fingers 188 reduces the dimensional tolerances required when manufacturing can 126 and spring seat 124. The fingers 188 can be bent radially inwardly a variety of distances while achieving engagement with spring seat 124. The flexible nature of fingers 188 cause fingers 188 to apply a radially outward gripping force on spring seat 124 such that spring seat 124 and can 126 remain attached to one another during use. This can be realized with lower dimensional tolerance requirements. Due to the lower dimensional tolerance requirements, a manufacturing cost of valve stem seal 120 can be reduced.

Fingers 188 can take a variety of forms. For example, fingers 188 can be generally rectangular in plan view as they extend around the exterior of can 126. In other exemplary configurations, fingers 188 can be trapezoidal, triangular or rounded, by way of non-limiting example. Furthermore, it should be appreciated that the number and spacing of fingers 188 can vary from that shown. Moreover, the positive stops used to limit the axial position of can 126 relative to spring seat 124 can vary from that shown. Additionally, the thickness of side wall 132 and/or fingers 188 can be dimensioned to arrive at a desired resilient biasing force against spring seat 124. The outer diameter of fingers 188 at second end 142 is larger than the inner diameter of annular portion 172 of spring seat 124. The larger radial dimension causes annular portion 172 of spring seat 124 to compress fingers 188 radially inwardly when assembled on can 126.

Referring now to FIGS. 11-14, a third embodiment of a valve stem seal 220 according to the present teachings is shown. Valve stem seal 220 is similar to valve stem seals 20 and 120 described above. As such, only the main differences are described herein. Valve stem seal 220 includes a can assembly 222 with a can 226, seal body 228 and spring 230. A spring seat 224 is attached to can assembly 222 to form valve stem seal 220.

In valve stem seal 220, spring seat 224 includes a plurality of spring fingers 274 extending axially upwardly from flange portion 270 while can 226 also includes a plurality of axially downwardly extending spring fingers 288 adjacent second end 242. Similar to valve stem seals 20, 120 discussed above, fingers 274 on spring seat 224 are biased radially inwardly while fingers 288 on can 226 are biased radially outwardly. Thus, in this embodiment, both can 226 and spring seat 224 include respective fingers 288, 274 thereon with respective gaps 292, 279 therebetween.

Figure 11:
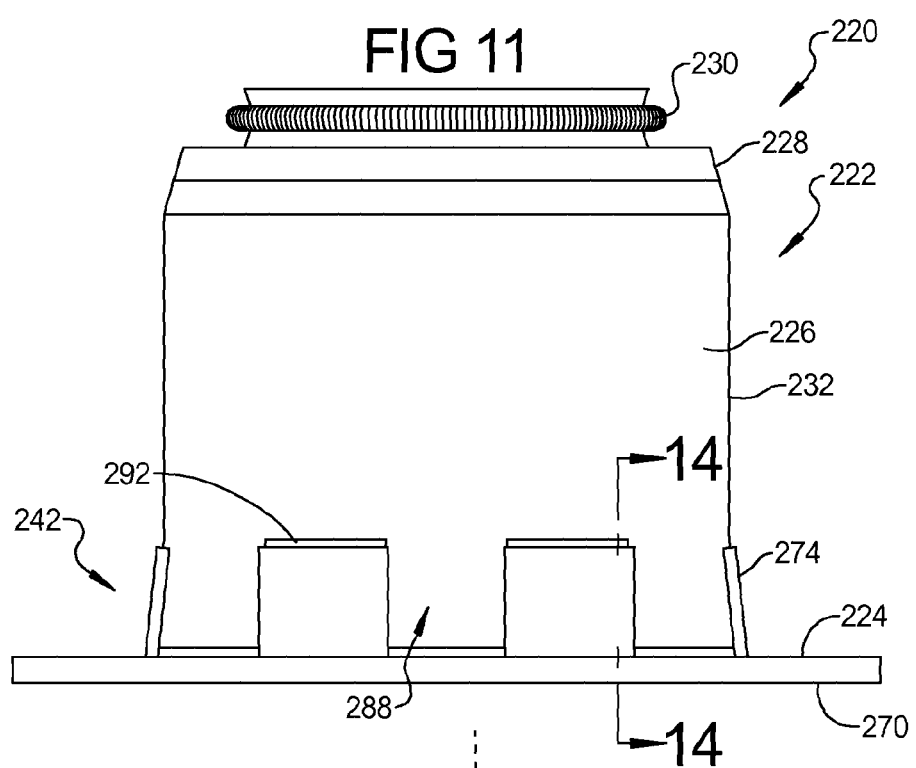
FIG. 11 is plan view of a third embodiment of a valve stem seal according to the present teachings.
Figure 12:
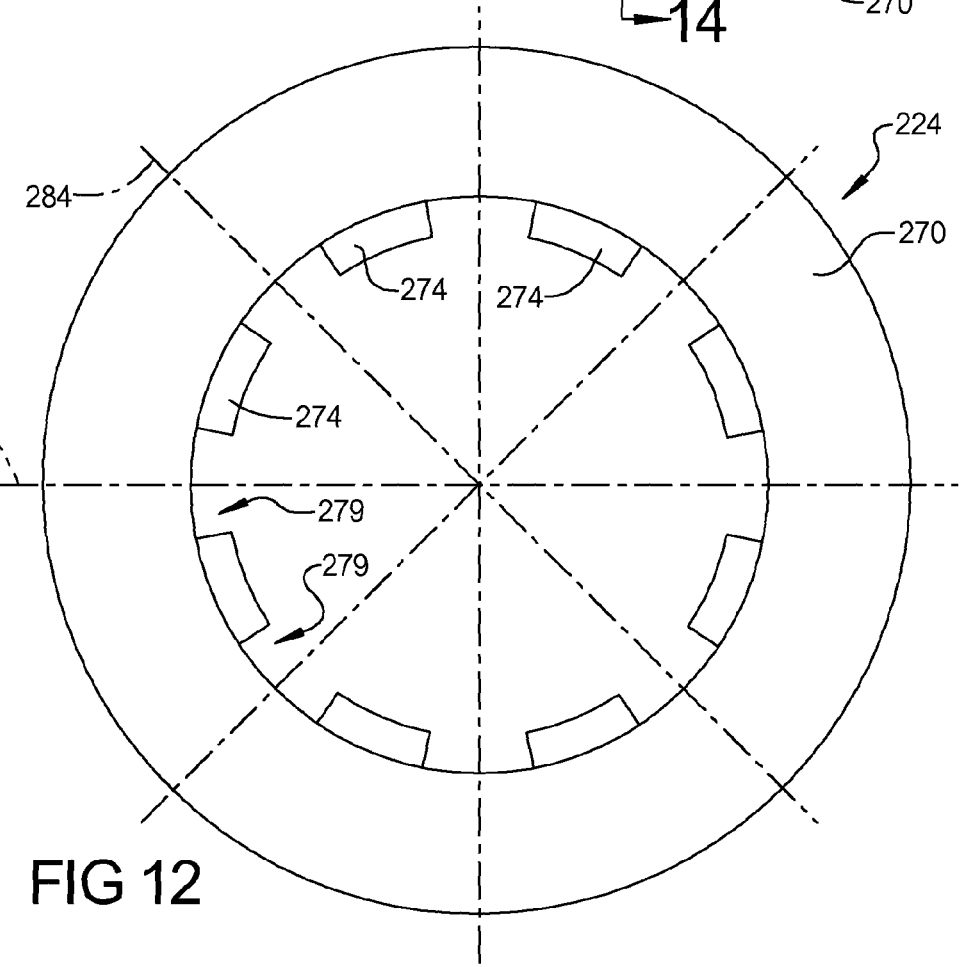
FIG. 12 is a top plan view of the spring seat of the valve stem seal of FIG. 11.
Figure 13:
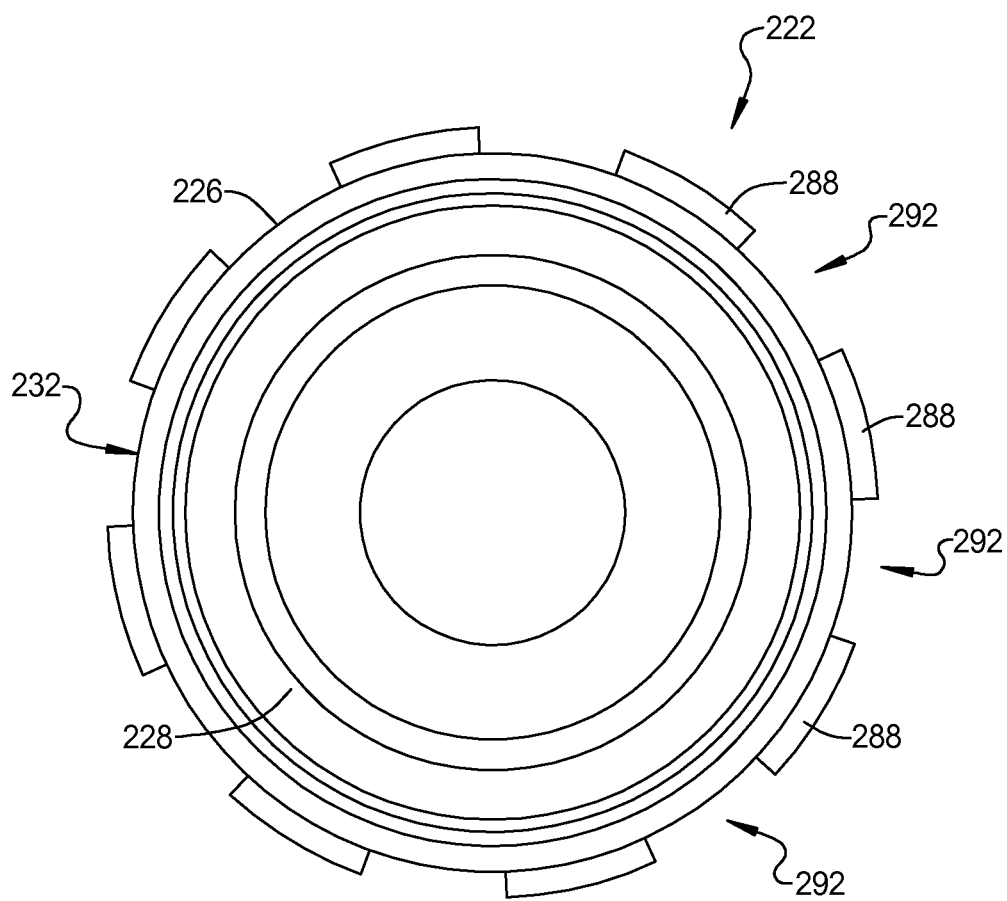
FIG. 13 is a top plan view of the can assembly of the valve stem seal of FIG. 11.

The width of fingers 274 of spring seat 224 can be greater than the width of the gap 292 between adjacent fingers 288 on can 226. Fingers 274 can be aligned with gaps 292 such that a portion of each finger 274 engages with a portion of two adjacent fingers 288, such as shown in FIG. 11. Outer diameter of can 226 at second end 242 is larger than the inner diameter of the central opening in spring seat 224. Similarly, the outer dimension of side wall 232 is greater than the inner diameter between the ends of opposite fingers 274. During assembly, spring seat 224 is positioned above can assembly 222 and moved relative thereto. As spring seat 224 moves along side wall 232 of can 226, fingers 274 flex radially outwardly, while fingers 288 flex radially inwardly as flange portion 270 moves along side wall 232. When fully assembled, fingers 274 provide a radially inward gripping force against can 226 while fingers 288 provide a radially outward gripping force against spring seat 224.

Positive stop features can be incorporated into spring seat 224 and can 226. For example, as shown in FIG. 14, fingers 288 can include a flared portion 289 that extends radially outwardly from the end thereof. Similarly, fingers 274 can include a flared portion 275 that extends radially inwardly. Engagement of flared portions 275, 289 with can 226 and spring seat 224, respectively, limits the axial positioning of spring seat 224 relative to can 226. It should be appreciated that the positive stops shown are merely exemplary and that other configurations and features can be utilized to implement the axial positioning of can 226 relative to spring seat 224.

Use of fingers 274 on spring seat 224 creates a plurality of axes of symmetry 284 as discussed above with reference to valve stem seal 20. As a result, spring seat 224 can bend along an axis of symmetry 284 (or an area proximate thereto) to accommodate the forces imparted on spring seat 224 by the valve spring. The bending reduces the potential for stress concentrations at the interface of flange portion 270 with fingers 274 and, as a result, can increase the useful life of valve stem seal 220.

The use of fingers 288 on can 226 and the fingers 274 on spring seat 224 reduces the dimensional tolerance requirements for valve stem seal 220. The reduced dimensional tolerance requirements for can 226 and spring seat 224 can reduce the cost to produce valve stem seal 220.

Can 226 and spring seat 224 can both be made from metal or a metal-containing material, but may also be made from other materials that can support the stresses associated with valve stem seal 220. Moreover, can 226 and spring seat 224, in some embodiments, may both be non-hardened such that fingers 274, 288 can bend and flex as needed during assembly and operation.

As stated above with reference to valve stem seals 20, 120, the size, shape and configuration of fingers 274, 288 can vary from that shown. For example, the fingers 274, 288 can be generally rectangular in shape as they curve around the respective opening in spring seat 224 and the periphery of side wall 232. Other shapes can be utilized, such as triangular, rounded, and trapezoidal by way of non-limiting example. Additionally, it should be appreciated that the spacing between adjacent fingers may also vary from that shown in order to provide a desired operation for valve stem seal 220. Furthermore, the thickness of fingers 274, 288 can also vary to provide a desired biasing force, resiliency, and/or flexibility.

Thus, valve stem seals according to the present teachings can have reduced stress concentrations such that an increased useful life may be realized and/or less material utilized while still providing a robust seal. Additionally, valve stem seals according to the present teachings may also result in a reduction in dimensional tolerance requirements for the various components such that reduce manufacturing costs may be achieved.

While the valve stem seals have been shown and described with reference to specific embodiments and examples, it should be appreciated that changes and deviations can be made and that such changes should not be regarded as a departure from the invention. For example, changes in size, shape and spacing of the various fingers utilized in the valve stem seals can vary from that shown. Additionally, the positive stops described herein are merely exemplary and different arrangements for forming the positive stops can be utilized. Thus, it should be appreciated that while the preceding description of the present teachings were made by way of specific examples and embodiments, such embodiments and examples are merely exemplary in nature and that changes thereto can be made and still be within the spirit and scope of the present teachings. Accordingly, these specific examples, illustrations, and embodiments disclosed herein are merely representative in nature, and changes and alterations should be considered to be within the scope of the present teachings and the claims.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A valve stem seal for use in a valve-containing device having a valve with a valve stem thereon, the valve stem seal comprising:
   a can having axially opposite first and second ends with a side wall extending axially therebetween, the can having a hollow interior defined at least partially by the side wall;
   a spring seat having a radially extending flange portion with axially opposite first and second surfaces and a central opening extending therethrough, the spring seat having a plurality of resilient spring seat fingers spaced apart around the opening and extending directly from the first surface of the flange portion in an axial direction, wherein prior to the spring seat being engaged with the can, the spring seat fingers have a not assembled position being at an angle between greater than 0 and to about 10 degrees from perpendicular to said radially extending flange portion; and
   a resilient seal body supported by the can and adjacent the first end, the seal body having a seal body opening extending therethrough for receiving the valve stem in sealing contact therewith when the valve stem seal is assembled into the valve-containing device,
   wherein the spring seat and the can are assembled together with the spring seat surrounding the second end of the can, the can extending at least partially through the opening, the spring seat fingers being bent radially outwardly from their undeformed position due to engagement with the side wall such that the spring seat fingers apply a radially inward force on the side wall, and the spring seat fingers allow the spring seat to move relative to the can when the first surface is being cyclically loaded by a valve spring.

2. The valve stem seal of claim 1, wherein the spring seat fingers are equally spaced apart around the opening.

3. The valve stem seal of claim 1, wherein the spring seat fingers allow the flange portion of the spring seat to bend relative to the can under the loading of the valve spring on the first surface.

4. The valve stem seal of claim 1, wherein the spring seat fingers bend relative to the flange portion under the loading of the valve spring on the first surface.

5. The valve stem seal of claim 1, wherein the side wall adjacent the second end includes a plurality of axially extending can fingers with gaps therebetween, the can fingers are spaced apart along the second end of the can, are biased radially outwardly, and are bent radially inwardly by engagement with the spring seat.

6. The valve stem seal of claim 5, wherein the spring seat fingers are aligned with the gaps between the can fingers and each spring seat finger overlaps at least a portion of at least one of the can fingers.

* * * * *